(12) United States Patent
Chiba et al.

(10) Patent No.: US 6,426,392 B1
(45) Date of Patent: Jul. 30, 2002

(54) THERMOPLASTIC CROSSLINKED PRODUCT AND HEAT-SENSITIVE ELASTIC ADHESIVE

(75) Inventors: Makoto Chiba; Junji Takase, both of Hyogo (JP)

(73) Assignee: Kaneka Corporation, Osaka (JP)

( * ) Notice: Subject to any disclaimer, the term of this patent is extended or adjusted under 35 U.S.C. 154(b) by 0 days.

(21) Appl. No.: 09/580,558

(22) Filed: May 30, 2000

(30) Foreign Application Priority Data

May 31, 1999 (JP) .......................................... 11-151718
Jun. 10, 1999 (JP) .......................................... 11-163611

(51) Int. Cl.$^7$ ............................................. C08F 210/00
(52) U.S. Cl. ...................... 525/326.5; 556/482; 556/81; 528/17
(58) Field of Search ...................... 525/326.5; 556/482, 556/81; 528/17

(56) References Cited

U.S. PATENT DOCUMENTS

| | | | | |
|---|---|---|---|---|
| 4,829,130 A | * | 5/1989 | Licchelli et al. | |
| 5,880,211 A | * | 3/1999 | Miyake et al. | |
| 5,905,123 A | * | 5/1999 | Cifuentes et al. | |
| 6,025,445 A | * | 2/2000 | Chiba et al. | |

FOREIGN PATENT DOCUMENTS

| | | | |
|---|---|---|---|
| EP | 0255170 A1 | 7/1987 | ............. C08F/8/26 |
| EP | 0758029 A2 | 2/1997 | ............. D01H/4/12 |
| EP | 0839872 A2 | 5/1998 | ......... C08L/101/10 |
| EP | 0931821 A2 | 7/1999 | ......... C09D/201/10 |
| EP | 0934956 A1 | 8/1999 | ............. C08F/2/44 |
| EP | 0934984 A1 | 8/1999 | ......... C08L/101/10 |
| EP | 1004628 A1 | 5/2000 | ........... C08L/57/00 |
| WO | WO 97/31066 | * 8/1997 | |
| WO | WO 99/09099 | * 2/1999 | |

* cited by examiner

Primary Examiner—Robert Dawson
Assistant Examiner—Kuo-Liang Peng
(74) Attorney, Agent, or Firm—Sughrue Mion, PLLC

(57) ABSTRACT

This invention is related to a thermoplastic crosslinked product obtainable by the crosslinking reaction of a composition comprising (A) a polymer having a silicon-containing group and (B) a tetravalent tin compound, said silicon-containing group having a hydrolyzable group bound to a silicon atom and capable of crosslinking through formation of a siloxane bond.

6 Claims, 1 Drawing Sheet

THERMOPLASTIC CROSSLINKED PRODUCT AND HEAT-SENSITIVE ELASTIC ADHESIVE

FIELD OF THE INVENTION

The present invention relates to a thermoplastic crosslinked product or heat-sensitive elastic adhesive which can be used with advantage as a sealing or adhesive having excellent workability and recyclability.

PRIOR ART

The sealant and adhesive in current use include hot-melt type and reactive sealant type. The hot melt type is predominantly composed of a thermoplastic elastomer and, for enhanced flexibility, contains a plasticizer such as mineral oil or paraffin oil. The hot melt type is superior in initial bond strength and workability but, because it is composed predominantly of a plasticized resin, is poor in heat resistance and weathering resistance. Moreover, because of its comparatively high plasticizer content, this adhesive is poor in antibleeding properties. The reactive sealant type is satisfactory in heat resistance and weathering resistance but poor in initial bond strength. Moreover, since it takes time for the adhesive to provide a necessary bond strength, the workability is unsatisfactory in some instances. Recently developed to overcome the shortcomings of said two types of adhesives is a reactive hot-melt material having the properties of a hot melt type and a reactive sealant type in one.

SUMMARY OF THE INVENTION

However, the reactive hot-melt material has the drawback that as the cure by reaction progresses, its thermoplasticity is lost to sacrifice workability and the material cannot be recycled any longer. The present invention has for its object to provide a thermoplastic crosslinked product or heat-sensitive elastic adhesive having the workability and recyclability of a hot-melt sealant and the rubber-like elasticity of a reactive type sealant.

As the catalyst which catalyzes the hydrolysis of a hydrolyzable silicon group or the condensation catalyst, tin compounds are well known, and for the purpose of curing polymers containing such silicon groups, tin compounds are generally employed. It is also known that the rubber-like properties such as stress relaxation and memory characteristics of the cured product differ according to whether the tin compound used is divalent or tetravalent. The cured product obtained by using a divalent tin compound is low in stress relaxation and high in memory characteristic, thus being close to the ideal elastomer, but the use of a tetravalent tin compound results in high stress relaxation and low memory characteristics. A relevant phenomenon observed in the crosslinked product obtained by using a tetravalent tin compound is the plastic deformation which occurs under prolonged loading. The inventors of the present invention found that this phenomenon unique to the crosslinked product obtained by curing a silicon group-containing polymer with a tetravalent tin compound is promoted by heating of the cured product and have developed the present invention.

The present invention, therefore, is directed to a thermoplastic crosslinked product obtainable by the crosslinking reaction of a composition comprising (A) a polymer having a silicon-containing group and (B) a tetravalent tin compound, said silicon-containing group having a hydrolyzable group bound to a silicon atom and capable of crosslinking through formation of a siloxane bond. The thermoplastic crosslinked product of the present invention shows thermoplasticity at a temperature lower than the thermal decomposition temperature of the main chain of the polymer.

In a further aspect, the present invention is directed to a heat-sensitive elastic adhesive comprising the thermoplastic crosslinked product of the present invention, that is to say a crosslinked product which is fluid under heating and shows rubber-like elasticity at room temperature (in the ordinary service temperature range).

DETAILED DESCRIPTION OF THE INVENTION

Figure 1:
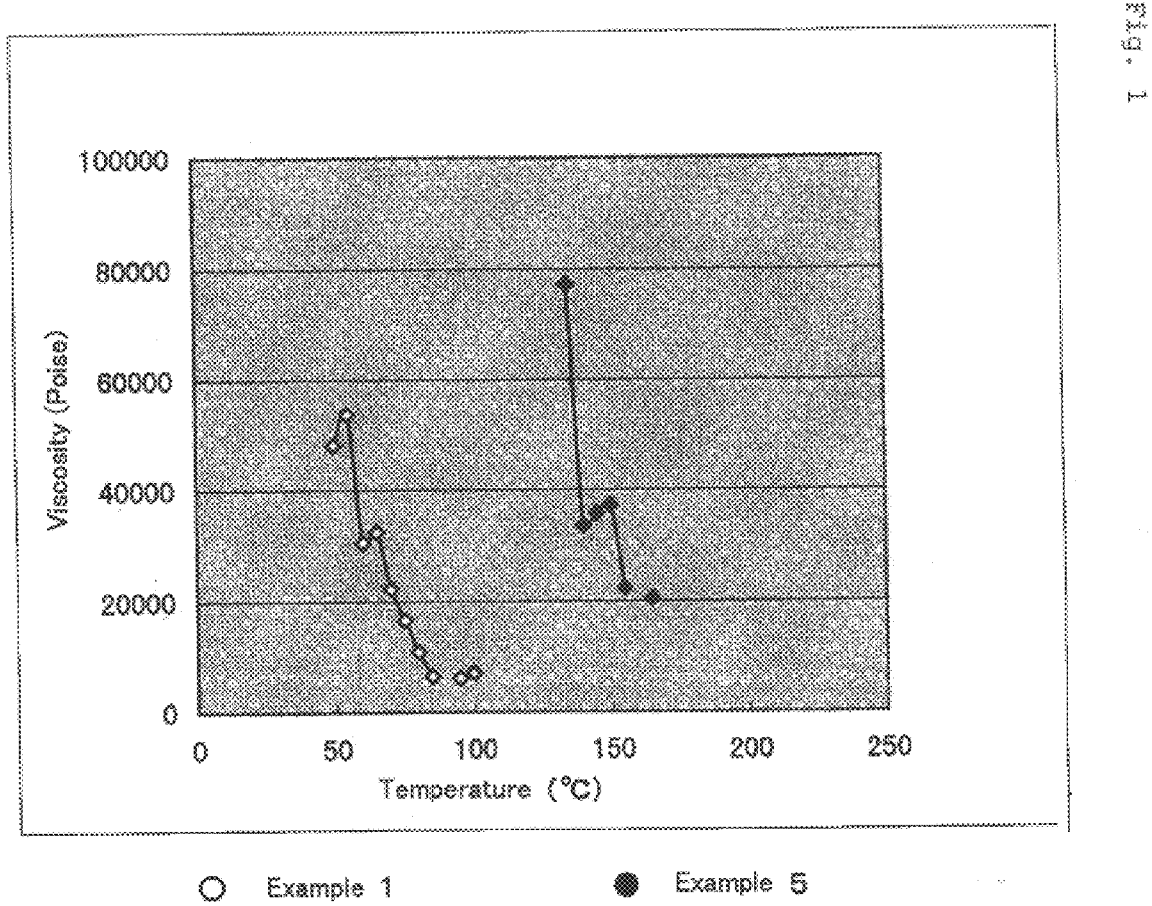
FIG. 1 is a temperature-viscosity correlogram constructed by heat-melting the crosslinked products according to Example 1 and Example 5.

The present invention is now described in detail. The term "thermoplastic crosslinked product" is used herein to mean a crosslinked product which shows plasticity by heating and rubber-like elasticity at room temperature (in the ordinary service temperature range). More concretely, the term means a crosslinked product which shows thermoplasticity at a temperature lower than the thermal decomposition temperature of the main chain of the polymer. The term "heat-sensitive elastic adhesive" is used herein to mean an elastic adhesive which is increased in bond strength when hot-pressed and specifically means an elastic adhesive such that adhesiveness is expressed by heating a condensation-crosslinked product of a hydrolyzable silicon group-containing saturated hydrocarbon polymer.

The present invention is embodied by using a saturated hydrocarbon polymer (hereinafter referred to as saturated hydrocarbon polymer (A)) having at least one reactive silicon group containing a hydroxyl or hydrolyzable group bound to a silicon atom and capable of crosslinking through formation of a siloxane bond.

The reactive silicon group mentioned above in the present invention is a well-known functional group and, as representative species thereof, includes groups of the general formula (1):

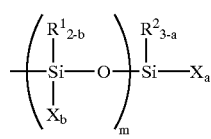

[wherein $R^1$ and $R^2$ each represents an alkyl group of 1 to 20 carbon atoms, an aryl group of 6 to 20 carbon atoms, an aralkyl group of 7 to 20 carbon atoms, or a triorganosiloxy group of the formula $R^3{}_3SiO$— ($R^3$ represents a monovalent hydrocarbon group of 1 to 20 carbon atoms; the three $R^3$s may be the same or different); when $R^1$ or $R^2$ occurs in two or more repeats, they may be the same or different; X represents hydroxy or a hydrolyzable group and when X occurs in two or more repeats, they may be the same or different; a represents an integer of 0 to 3; b represents an integer of 0 to 2; provided, however, that a+mb≧1; b need not be the same over m repeats of $(SiR^1{}_{2-b}X_bO)$; m represents an integer of 0 to 19].

The hydrolyzable group in the above general formula (1) is not particularly restricted but may be a known hydrolyzable group. Specifically, however, hydrogen, alkoxy, acyloxy, ketoximato, amino, amido, aminooxy, mercapto, alkenyloxy, etc. can be mentioned. Among these, alkoxy groups are particularly preferred in view of the hydrolizability under mild conditions and ease of handling.

The hydrolyzable group or hydroxyl group, mentioned above, may be attached, in the number of 1 to 3, per silicon atom and the preferred range of (a+mb) is 1 to 5. When said hydrolyzable group or hydroxyl group occurs in the number of two or more in the reactive silicon group, they may be the same or different. While the number of silicon atoms forming said reactive silicon group may be either one or two or more, the number of silicon atoms bound by, for example, siloxane bonding is preferably not more than 20. Particularly preferred from the standpoint of availability is a reactive silicon group of the general formula (2):

$$—SiR^2{}_{3-a}X_a \qquad (2)$$

(wherein $R^2$, X and a are respectively as defined above).

The reactive silicon group exists in the number of at least one, preferably 1.1 to 5, per mole of the saturated hydrocarbon polymer. If the number of reactive silicon groups per molecule is less than one, curability will be insufficient and satisfactory rubber-like elastic properties may hardly be obtained. The reactive silicon group may be present at the molecular chain terminal of a saturated hydrocarbon polymer or present internally, or even present both terminally and internally. Particularly when the reactive silicon group is present at the molecular chain terminal, the amount of effective crosslinked chain length of the saturated hydrocarbon polymer component in the final crosslinked product is comparatively large with the result that an elastomeric crosslinked product with high strength and high elongation is more easily obtained. Saturated hydrocarbon polymers having said reactive silicon group may be used singly or in a combination of two or more species.

The saturated hydrocarbon polymer for use in the present invention can be prepared by:

(1) the polymerization of an olefinic compound of 1 to 6 carbon atoms, such as ethylene, propylene, 1-butene, isobutylene and the like, as the main monomer or (2) the homopolymerization of a diene compound, such as butadiene, isoprene and the like or copolymerization thereof with said olefinic compound and subsequent hydrogenation, to mention just a few examples. From the standpoint of ease of introduction of the functional group at the terminal, ease of molecular weight control, and the ease of increasing the number of functional groups which can be introduced, the preferred saturated hydrocarbon polymer is an isobutylene polymer, a hydrogenated polybutadiene polymer or a hydrogenated polyisoprene polymer.

The isobutylene polymer mentioned just above may be such that all the monomer units thereof are isobutylene units or may contain a monomer component copolymerizable with isobutylene in a proportion of preferably not more than 50% (weight %; the same applies hereinafter), more preferably not more than 30%, still more preferably not more than 10%. As such monomer components, there can be mentioned olefins of 4~12 carbon atoms, vinyl ethers, aromatic vinyl compounds, vinylsilanes, and allylsilanes, among others. Specifically, said copolymer component includes 1-butene, 2-butene, 2-methyl-1-butene, 3-methyl-1-butene, pentene, 4-methyl-pentene, hexene, vinylcyclohexane, methyl vinyl ether, ethyl vinyl ether, isobutyl vinyl ether, styrene, α-methylstyrene, dimethylstyrene, p-t-butoxystyrene, p-hexenyloxystyrene, p-allyloxystyrene, p-hydroxystyrene, β-pinene, indene, vinyldimethylmethoxysilane, vinyltrimethylsilane, divinyldimethoxysilane, divinyldimethylsilane, 1,3-divinyl-1,1,3,3-tetramethyldisiloxane, trivinylmethylsilane, tetravinylsilane, allyldimethylmethoxysilane, allyltrimethylsilane, diallyldimethoxysilane, diallyldimethylsilane, γ-methacryloyloxypropyltrimethoxysilane, γ-methacryloyloxypropylmethyldimethoxysilane and so on.

The hydrogenated polybutadiene polymer and other saturated hydrocarbon polymers mentioned above, too, as it is the case with said isobutylene polymer, may contain other monomer units in addition to the main monomer units. Furthermore, the saturated hydrocarbon polymer for use as (A) component in the present invention may contain, within the range conducive to the object of the invention, such monomer units which would remain double bonds after polymerization, e.g. polyene compounds such as butadiene, isoprene, 1,13-tetradecadiene, 1,9-decadiene, 1,5-hexadiene, etc., in a small proportion, preferably within the range of up to 10%.

The number average molecular weight of said saturated hydrocarbon polymer, preferably said isobutylene polymer, hydrogenated polyisoprene polymer or hydrogenated polybutadiene polymer, is preferably within the range of about 500 to 100000, and from the standpoint of ease of handling, a liquid polymer having a molecular weight of about 1000 to 40000 is particularly preferred. As to molecular weight distribution (Mw/Mn), a narrower distribution is preferred because the viscosity is lower as the distribution is narrower, with the molecular weight being held constant.

The process for producing said reactive silicon group-containing saturated hydrocarbon polymer is now described in detail, taking an isobutylene polymer and a hydrogenated polybutadiene polymer as examples. Among species of said reactive silicon group-containing isobutylene polymer, a reactive silicon group-terminated isobutylene polymer can be produced by using an isobutylene polymer having terminal functional groups, preferably having functional groups at all of its terminals, which is obtainable by the polymerization technique called "inifer method" (a cation polymerization method using a certain compound which doubles as an initiator called "inifer" and as a chain transfer agent). Processes of this kind are described in Japanese Kokai Publication Sho-63-6003, Sho-63-6041, Sho-63-254149, Sho-64-22904 and Sho-64-38407. On the other hand, an isobutylene polymer having a reactive silicon group internally of its molecular chain can be produced by adding a reactive silicon group-containing vinylsilane or allylsilane to a monomer component composed predominantly of isobutylene and copolymerizing them. Furthermore, an isobutylene polymer having reactive silicon groups both terminally and internally can be produced as follows. Thus, in the polymerization for production of said isobutylene polymer having functional groups at terminals, a reactive silicon group-containing vinylsilane or allylsilane is copolymerized with the main component isobutylene monomer and, then, the reactive silicon group is introduced into terminals of the copolymer.

The reactive silicon group-containing vinylsilane or allylsilane includes such specific compounds as vinyltrichlorosilane, vinylmethyldichlorosilane, vinyldimethylchlorosilane, vinyldimethylmethoxysilane, divinyldichlorosilane, divinyldimethoxysilane, allyltrichlorosilane, allylmethyldichlorosilane, allyldimethylchlorosilane, allyldimethyldimethoxysilane, diallyldichlorosilane, diallyldimethoxysilane, γ-methacryloyloxypropyltrimethoxysilane and γ-methacryloyloxypropylmethyldimethoxysilane, among others.

The process for producing a hydrogenated polybutadiene polymer may for example be as follows. First, the hydroxyl group of a hydroxy-terminated hydrogenated polybutadiene polymer is converted to an oxymetal group such as —ONa and —OK. The polymer is then reacted with an organohalogen compound of the general formula (3):

$$CH_2=CH-R^4-Y \qquad (3)$$

[wherein Y represents halogen such as chloro or iodo; $R^4$ represents a divalent hydrocarbon group of the formula $-R^5-$, $-R^5-Oc(=O)-$ or $-R^5-C(=O)-$ (where $R^5$ represents a divalent hydrocarbon group of 1 to 20 carbon atoms, preferably an alkylene group, a cycloalkylene group, an allylene group or an aralkylene group), more preferably a divalent group selected from the group consisting of $-CH_2-$ and $-p-R^6-C_6H_4-CH_2-$ ($R^6$ represents a hydrocarbon group of 1 to 10 carbon atoms)], to thereby produce a hydrogenated polybutadiene polymer having olefinic terminal groups (hereinafter referred to sometimes as an olefinic group-terminated hydrogenated polybutadiene polymer), in the first place.

The technology for converting the terminal hydroxyl group of a hydroxy-terminated hydrogenated polybutadiene polymer to an oxymetal group includes the method of reacting the polymer with an alkali metal, e.g. Na or K; a metal hydride, e.g. NaH; a metal alkoxide, e.g. $NaOCH_3$; or a caustic alkali, e.g. NaOH or KOH. The above production process gives an olefinic group-terminated hydrogenated polybutadiene polymer whose molecular weight is substantially equal to the molecular weight of the starting hydroxy-terminated hydrogenated polybutadiene polymer but when it is desired to obtain a polymer of greater molecular weight, a polyvalent organohalogen compound containing two or more halogen atoms per molecule, such as methylene chloride, bis(chloromethyl)benzene, bis(chloromethyl)ether or the like, can be reacted prior to said reaction with an organohalogen compound of the general formula (3). The reaction of the resulting polymer with an increased molecular weight with the organohalogen compound of the general formula (3) can give an olefinic group-terminated hydrogenated polybutadiene polymer of increased molecular weight.

The above organohalogen compound of the general formula (3) includes but is not limited to such species as allyl chloride, allyl bromide, vinyl(chloromethyl)benzene, allyl (chloromethyl)benzene, allyl(bromomethyl)benzene, allyl (chloromethyl)ether, allyl(chloromethoxy)benzene, 1-butenyl(chloromethyl)ether, 1-hexenyl(chloromethoxy) benzene and allyloxy(chloromethyl)benzene. Among these, allyl chloride is preferred because it is available at low cost and ready to react.

Introduction of said reactive silicon group into an olefinic group-terminated hydrogenated polybutadiene polymer can be accomplished, just as it is the case with the production of said reactive silicon group-terminated isobutylene polymer, by way of the addition reaction of, for example, a hydrosilane compound resulting from binding of one hydrogen atom to a group of the general formula (1), preferably a compound of the general formula (4):

$$HSiR^2_{3-a}X_a \qquad (4)$$

(wherein $R^2$, X and a are respectively as defined hereinbefore), in the presence of a platinum catalyst.

The hydrosilane compound resulting from binding of one hydrogen atom to a group of the general formula (1) includes but is not limited to halosilanes such as trichlorosilane, methyldichlorosilane, dimethylchlorosilane, phenyldichlorosilane, etc.; alkoxysilanes such as trimethoxysilane, triethoxysilane, methyldiethoxysilane, methyldimethoxysilane, phenyldimethoxysilane, etc.; acyloxysilanes such as methyldiacetoxysilane, phenyldiacetoxysilane, etc.; and ketoximatosilanes such as bis(dimethylketoximato)methylsilane, bis (cyclohexylketoximato)methylsilane and so on. Among these compounds, halosilanes and alkoxysilanes are particularly preferred.

The proportion by weight of the polymer (A) in the total crosslinked product is preferably less than 30%, more preferably less than 25%, for insuring better thermoplasticity.

The tetravalent tin compound for use as (B) component in the present invention includes dialkyltin dialkoxides such as dibutyltin dimethoxide, dibutyltin dipropoxide and so on. Among these, a dialkyltin dimethoxide such as dibutyltin dimethoxide is preferred. Moreover, chelate compounds such as dibutyltin-bis(acetylacetonate) and tin derivatives of hydroxyl-containing aromatic compounds, such as dibutyltin diphenoxide, can likewise be used with advantage. While the compound (B) of the invention acts as a silanol condensation catalyst, it can be used in combination with other silanol condensation catalysts insofar as the object of the invention can be accomplished. Such silanol condensation catalysts include titanic acid esters such as tetrabutyl titanate, tetrapropyl titanate, etc.; tin carboxylates such as dibutyltin dilaurate, dibutyltin diacetate, dibutyltin diethylhexanoate, dibutyltin dioctanoate, dibutyltin dimethylmalate, dibutyltin diethylmalate, dibutyltin dibutylmalate, dibutyltin diisooctylmalate, dibutyltin ditridecylmalate, dibutyltin dibenzylmalate, dibutyltin maleate, dibutyltin diacetate, dibutyltin diphenoxide, tin octoate, dioctyltin distearate, dioctyltin dilaurate, dioctyltin diethylmalate, dioctyltin diisooctylmalate, dioctyltin diversatate, tin naphthenate, etc.; tin oxides such as dibutyltin oxide, dioctyltin oxide, etc.; reaction products of dibutyltin oxide with phthalic esters; dibutyltin bis (acetylacetonate); organoaluminum compounds such as aluminum tris(acetylacetonate), aluminum tris (ethylacetoacetonate), diisopropoxyaluminum ethylacetoacetate, etc.; chelate compounds such as zirconium tetraacetylacetonate, titanium tetraacetylacetonate, etc.; lead octoate; amine compounds such as butylamine, octylamine, laurylamine, dibutylamine, monoethanolamine, diethanolamine, triethanolamine, diethylenetriamine, triethylenetetramine, oleylamine, cyclohexylamine, benzylamine, diethylaminopropylamine, xylylenediamine, triethylenediamine, guanidine, diphenylguanidine, 2,4,6-tris (dimethylaminomethyl)phenol, morpholine, N-methylmorpholine, 2-ethyl-4-methylimidazole, 1,8-diazabicyclo(5.4.0)undecene-7 (DBU), etc.; salts of such amine compounds with a carboxylic acid or the like; low molecular polyamides obtainable from an excess of a polyamine with polybasic acids; reaction products obtainable from an excess of a polyamine with epoxy compounds; amino-containing silane coupling agents such as γ-aminopropyltrimethoxysilane, N-(β-aminoethyl) aminopropylmethyldimethoxysilane, etc.; and other known silanol condensation catalysts inclusive of various acid catalysts and basic catalysts.

These catalysts may be used singly or in a combination of two or more species.

The formulating amount of the silanol curing catalyst for (B) component, based on 100 parts (parts by weight; the same applies hereinafter) of the polymer (A), is preferably about 0.1 to 20 parts, more preferably 1 to 10 parts. If the formulating amount of the silanol curing catalyst is less than the above range, the curing speed may at times be reduced and, in some cases, the curing reaction will hardly proceed well. On the other hand, if the proportion of the silanol curing catalyst exceeds the above-mentioned range, local heating and foaming will take place during the curing process to interfere with the production of a satisfactory crosslinked product. In addition, the pot life of the composition is shortened to sacrifice workability.

The composition of the present invention is preferably supplemented with water or a metal salt hydrate as a source of water necessary for the condensation curing of the polymer (A). As the metal salt hydrate, many hydrates available commercially can be liberally used and, as examples, alkaline earth metal salt hydrates and other metal salt hydrates can be mentioned. The preferred, among these, are alkali metal salt hydrates and alkaline earth metal hydrates, and more specifically, $MgSO_4 \cdot 7H_2O$, $Na_2CO_3 \cdot 10H_2O$, $Na_2SO_4 \cdot 10H_2O$, $Na_2S_2O_3 \cdot 5H_2O$, $Na_3PO_4 \cdot 12H_2O$, and $Na_2B_4O_7 \cdot 10H_2O$, among others, can be mentioned. The metal salt hydrate is preferably used within the range of 0.01 to 50 parts per 100 parts of the reactive silicon group-containing saturated hydrocarbon polymer. The more preferred range is 0.1 to 30 parts, the still more preferred range is 1 to 20 parts, and the most preferred range is 2 to 10 parts on the same basis. The metal salt hydrates mentioned above may be used singly or in a combination of two or more species.

According to the specific characteristics required for intended uses, the composition of the present invention may contain optional components other than said components such as plasticizers, hindered phenol or hindered amine antioxidants, ultraviolet absorbers, light stabilizers, pigments, surfactants, and even tackifiers such as silane coupling agents, each in a suitable proportion. Among such components, the plasticizer is used to adjust the flow characteristic for improved workability, and although any ordinary plasticizer can be used, it is preferable to use a hydrocarbon compound well compatible with the (A) component polymer of the invention. Such plasticizers can be used singly or in combination. Moreover, even a plasticizer which, by itself, is poorly compatible with the polymer can also be used if it is used in combination with said hydrocarbon compound for improved compatibility.

The thermoplastic crosslinked product according to the present invention can be obtained as an elastomer, which is rubber-like at room temperature, by mixing formulated amounts of (A), (B) and other said components by means of a mixer, a mixing roll or a kneader or dissolving them in a suitable quantity of a solvent and allowing the resulting formulation to stand at room temperature or under heating for several hours to about one week.

The thermoplastic crosslinked product according to the present invention is useful as a heat-sensitive elastic adhesive which finds application in the electric/electronic field, as a water seal in civil engineering, or in such applications as buildings, ships, automobiles, rolling stock and furniture. Furthermore, since this adhesive adheres firmly to a broad range of adherends, such as glass, stone, ceramics, wood, synthetic resin and metal, under non-primer conditions, it can be used as various kinds of elastic adhesives. In addition, the heat-sensitive elastic adhesive of the invention adheres with good security to infrared-reflecting glass, iron, genuine aluminum, anodized aluminum, and polycarbonate resin, it can be used with advantage as a sealing material for laminated glass.

The thermoplastic crosslinked product according to the present invention displays excellent workability upon heating and undergoes phase change between elastomeric consistency and fluidity on repeated cooling and heating so that it can be used with advantage as a sealing agent or an elastic adhesive.

BEST MODE FOR CARRYIGN OUT THE INVENTION

The following examples illustrate the present invention in further detail without delimiting the scope of the invention.

EXAMPLES 1 TO 4 and

Comparative Examples 1 and 2

According to the recipes shown in Table 1, the components other than the curing catalyst tin compound were stirred together at room temperature and further compounded with a 3-roll paint mill (manufactured by Inoue Seisakusho) to prepare a paste. To this paste was added the curing catalyst, followed by stirring to give a composition. A series of crosslinkable silicon group-containing isobutylene polymers are available from Kaneka Corporation under the trade name of EPION, and both EP-103S and EP-505S represent grades of EPION. Thus, EP-103S is a low molecular grade and EP-505S is a high molecular grade. Scat27 [manufactured by Sankyo Yuki Gosei] is di-n-butyltin dimethoxide and U-220 [manufactured by Nitto Kasei] is dibutyltin diacetylacetonate.

TABLE 1

| Formulation | Utility | Ex. 1 | Ex. 2 | Compar. Ex. 1 | Ex. 3 | Ex. 4 | Compar. Ex. 2 |
|---|---|---|---|---|---|---|---|
| EP-103S | EPION | — | — | — | 150 | 150 | 150 |
| EP-505S | EPION | 150 | 150 | 150 | — | — | — |
| PW-380 | plasticizer | 400 | 400 | 400 | 400 | 400 | 400 |
| fuse-rex E-1 | molten silica | 200 | 200 | 200 | 200 | 200 | 200 |
| Scat27 | curing catalyst | — | 4 | — | — | 4 | — |
| OT/LA | curing catalyst | — | — | 4 | — | — | 4 |
| U-220 | curing catalyst | 4 | — | — | 4 | — | — |
| Irganox 1010 | antioxidant | 1 | 1 | 1 | 1 | 1 | 1 |
| Sumisorb 400 | UV absorber | 1 | 1 | 1 | 1 | 1 | 1 |
| Sanol LS-765 | light stabilizer | 1 | 1 | 1 | 1 | 1 | 1 |
| water | | 2 | 2 | 2 | 2 | 2 | 2 |
| Polymer content (% by weight) | | 16% | 16% | 16% | 16% | 16% | 16% |
| Melting phenomenon | | o | o | x | o | o | x |

Curing condition; 23° C. × 3 days + 50° C. × 4 days
Melting phenomenon; o: Melting and fluidity were shown. X: Melting was not shown.

Each of the compositions was spread to about 3 mm on a Teflon sheet and allowed to cure at room temperature for 3 day and then caused to cure at 50° C. for 4 days to provide crosslinked products according to Examples 1 to 4. On the other hand, crosslinked products were prepared by using a divalent tin catalyst (OT/LA in the table), namely 3 weight parts of stannous octoate (Neostann U-28; Nitton Kasei) and 0.75 weight part of laurylamine (Farmin 20D; Kao Corporation), in lieu of said tetravalent tin compound, in Comparative Examples 1 and 2. The crosslinked products were subjected to the following evaluation.

The results are shown in Table 2.

TABLE 2

| Sample | Before heating After heating | M50 Mpa | M100 Mpa | TB Mpa | EB % | Gel fraction % |
|---|---|---|---|---|---|---|
| Ex. 1 | STD | 0.011 | 0.018 | 0.137 | 550 | 44.1 |
| | 150° C. → 23° C. | 0.005 | 0.010 | 0.072 | 520 | 34.9 |
| Ex. 2 | STD | 0.010 | 0.018 | 0.132 | 570 | 43.0 |
| | 150° C. → 23° C. | 0.005 | 0.008 | 0.047 | 510 | 41.8 |
| Compar. Ex. 1 | STD | 0.021 | 0.042 | 0.08 | 190 | 47.7 |
| | 150° C. → 23° C. | — | — | — | — | 45.5 |
| Ex. 3 | STD | 0.034 | 0.068 | 0.075 | 110 | 44.7 |
| | 150° C. → 23° C. | — | — | — | — | 47.3 |
| Ex. 4 | STD | 0.035 | 0.073 | 0.104 | 140 | 45.9 |
| | 150° C. → 23° C. | — | — | — | — | 42.8 |
| Compar. Ex. 2 | STD | 0.054 | — | 0.081 | 80 | 50.8 |
| | 150° C. → 23° C. | — | — | — | — | 46.9 |

In the Table. "STD" means the sample not heated, and "150° C. → 23° C." means the sample heated.

The melting phenomenon under heating was observed only in Examples 1 to 4. In Example 1 and 2 where the high molecular grade EP505S was used, the crosslinked products were molten on about 30 minutes of heating at 150° C., and in Examples 3 and 4 where the low molecular grade EP103S was used, too, the crosslinked products were molten on 30 minutes of heating at 150° C. On the other hand, in Comparative Examples 1 and 2 where the divalent tin compound (OT/LA) was used, the melting phenomenon was not observed even when heating was continued for 180 minutes, regardless of the molecular weight of the polymer used.

Then, the crosslinked products according to Examples 1 and 2, which did melt on heating, were subjected to a dumbbell tensile test before and after melting. Moreover, with all the recipes, the determination of gel fraction was carried out before and after heating. With regard to the recipes of Examples 1 and 2 where the melting on heating was observed, tensile strengths after melting (150° C.→23° C. in the table) were decreased from the values prior to melting (STD in the table). However, in view of the fact that samples after melting (150° C.→23° C.) contained copious air cells and could not necessarily be considered to have shown accurate values, that there was little change in EB, and that the gel fractions were not much changed, either, no remarkable changes seemed to have occurred in physical properties due to melting. On the other hand, regarding the recipes of Comparative Examples 1 and 2, the tensile measurement after heating (150° C.→23° C.) was not performed because of the absence of the melting phenomenon but the gel fractions after heating showed substantially no change from the heating values.

Comparative Examples 3 to 5

The compositions according to the recipes shown in Table 3 were cured. The crosslinked products in Comparative Examples 3 to 5 did not melt even when heating under the same condition as Example 4.

TABLE 3

| Formulation | Utility | Compar. Ex. 3 | Compar. Ex. 4 | Compar. Ex. 5 |
|---|---|---|---|---|
| EP-103S | EPION | 130 | 130 | 130 |
| PAO5004 | plasticizer | 0 | 70 | 200 |
| Scat27 | curing catalyst | 1 | 1 | 1 |
| OT/LA | curing catalyst | — | — | — |
| MARK AO-50 | antioxidant | 1 | 1 | 1 |
| Sumisorb 400 | UV absorber | 1 | 1 | 1 |
| Sanol LS-765 | light stabilizer | 1 | 1 | 1 |
| water | | 2 | 2 | 2 |
| Polymer content (% by weight) | | 77% | 50% | 30% |
| Melting phenomenon | | X | X | X |

Melting phenomenon:
○: Melting and fluidity were shown.
X: Melting was not shown.

EXAMPLE 1 AND EXAMPLE 5
[Test for Temperature Dependence of Extrudability]

Using the recipes shown in Table 4, the test for temperature dependence of extrudability was carried out with a capillary rheometer (Shimadzu Corporation) (test conditions: cylinder pressure 10 kgf/cm$^2$, 1 mm-dia. die, incremental temperature method 5° C./min).

TABLE 4

| Formulation | Utility | Ex. 1 | Ex. 5 |
|---|---|---|---|
| EP-103S | EPION | — | 130 |
| EP-505S | EPION | 150 | — |
| PS-32 | plasticizer | — | 280 |
| PW-380 | plasticizer | 400 | — |
| fuse-rex E-1 | molten silica | 200 | 400 |
| U-220 | curing catalyst | 4 | 4 |
| Irganox 1010 | antioxidant | 1 | — |
| Sumisorb 400 | UV absorber | 1 | — |
| Sanol LS-765 | light stabilizer | 1 | — |
| water | | 2 | 2 |
| Polymer content (% by weight) | | 16% | 12% |

In this test for temperature dependence of extrudability, each crosslinked product emerged from the die orifice in a thread form at a temperature of about 50° C., indicating that the crosslinked products of the invention are extrudable under heating. The relevant temperature-viscosity correlogram is presented in FIG. 1. The test methods used in the above examples are as follows.

(Kohka Type Flow Test)
(1) A crosslinked product sample, 1.25 g, was weighed out and set in a capillary rheometer (CFT-500C; Shimadzu).
(2) The test conditions used were starting temperature: 60° C., rate of temperature increase: 10° C./min, preheat time: 180 sec, cylinder pressure: 10 kgf/cm$^2$, die-dimensions= L:10 mm×D: 1 mm, shear stress: 2.451E5dyn/cm$^2$.

(Tensile Test)
(1) From a 3 mm-thick sample sheet, a test specimen was cut out wit a JIS #3 dumbbell die.
(2) The thickness of the dumbbell specimen was measured.
(3) The tensile test was carried out with an autograph (Shimadzu AR-5422).

(Determination of Gel Fraction)
(1) A suitable amount of each crosslinked product was wrapped up in a 200-mesh metal sheet.
(2) The wrapped crosslinked product was immersed in a hexane bath for 1 day.
(3) The crosslinked product withdrawn from the hexane bath was dried and weighed, and the gel fraction was calculated from the weight of insoluble matter with the weight of the whole crosslinked product being taken as 100%.

The evaluation of the above parameters revealed that the crosslinked product according to the present invention is a recyclable material which can be recycled repeatedly by heating and cooling.

EXAMPLE 6

To 130 weight parts of a reactive silicon group-containing isobutylene polymer (Epion EP303S; manufactured by Kaneka Corporation) as the saturated hydrocarbon polymer (A), 90 weight parts of paraffinic process oil (Diana Process Oil PS-32; Idemitsu Kosan Co.), 180 weight parts of ground calcium carbonate (Liton A; Shiraishi Calcium Co.), 50 weight parts of colloidal calcium carbonate gel (Hakuenka CC; Shiraishi Kogyo), 100 weight parts of talc (LMR; Maruo Calcium), 1 weight parts of Irganox 1010 (Ciba-Geigy), 1 weight part of Sumisorb 400 (Sumitomo Chemical Co.) and 1 weight part of Sanol LS-765 (Sankyo Co.) as an antioxidant, 3 weight parts of light stabilizer (Sandant NBC; Sanshin Kagaku), 5 weight parts of thixotropic agent (Disparlon #305; Kusumoto Kasei), and 4 weight parts of γ-isocyanatopropyltriethoxysilane (A-1310; Nippon Unicar) and 2 weight parts of γ-glycidoxy-propyltrimethoxysilane (A-187; Nippon Unicar) as silane coupling agents were added and the mixture was well compounded with a 3-roll paint mill to prepare a main component. On the other hand, 4 weight parts of dibutyltin dimethoxide (Scat-27; Sankyo Organic Chemical) as the tetravalent silanol condensation catalyst was added to a mixture of 16 weight parts of paraffinic process oil (Diana Process Oil PS-32; Idemitsu Kosan), 10 weight parts of ground calcium carbonate (Snowlite SS; Maruo Calcium); 2.5 weight parts of carbon black (#CB30; Mitsubishi Kasei Corporation), 4 weight parts of water and 6 weight parts of Zeolite 4A (Wako Pure Chemical Ind.) and the composition was manually compounded in a disposable cup. Then, using a homogenizer (manufactured by Nippon Seiki Seisakusho), the compound was subjected to 3 cycles of 10-minute stirring (10000 rpm) to prepare a curing component.

The adhesiveness of the adhesive composition prepared as above to adherends was evaluated by the following test method and the results are shown in Table 5.

TABLE 5

The adhesiveness of the heat sensitive adhesive according to Ex. 6

| Curing condition | 50% tensile stress (kgf/cm$^2$) | Maximum tensile stress (kgf/cm$^2$) | Elongation after fracture (%) | Failure state | | |
|---|---|---|---|---|---|---|
| | | | | CF | TCF | AF |
| 23° C. × 7 days | — | 1.44 | 12 | 0 | 0 | 100 |
| 23° C. × 13 days | — | 1.45 | 12 | 0 | 0 | 100 |
| 23° C. × 34 days | — | 1.62 | 13 | 0 | 0 | 100 |
| 23° C. × 7 days + 50° C. × 7 days | 5.64 | 5.71 | 54 | 85 | 0 | 15 |
| 23° C. × 52 days + 50° C. × 7 days | 6.44 | 6.90 | 59 | 100 | 0 | 0 |

CF: cohesive failure
TCF: thin layer cohesive failure
AF: adhesive failure

Tensile test specimens were prepared in accordance with the method for preparation of tensile adhesion test specimens as directed in JIS A5758-1992. Thus, a polycarbonate substrate was used to assemble an H-form. Then, the above main component and curing component were weighed out in a ration corresponding to the total numbers of parts of the respective components, thoroughly admixed, filled into the H-form, and allowed to cure at 23° C. The substrate used for the H tensile test was 5×5×0.5 cm. It was used after the protective film had been peeled off the surface prior to filling. The crosslinked product (heat-sensitive elastic adhesive) samples were either allowed to stand at room temperature for predetermined times (0 to 52 days) or cured in a perfect oven at 50° C. for 7 days, and the respective samples were compared for bond strength and evaluated. The H tensile test was performed in a constant-temperature chamber at 23° C. and 65±5% R.H. using a pulling speed of 50 mm/min in conformity with the tensile adhesion test method directed in JIS A5758-1992. The incidences of cohesive failure (CF), thin-layer cohesive failure (TCF) and adhesive failure (AF) in the table are those found by visual assessment of the surface of cleavage after the tensile test.

It will be apparent from Table 5 that although the adhesive of the present invention is not fully satisfactory in the adhesion to the polycarbonate adherend when it was allowed to stand at room temperature, it showed good substrate adhesion when cured under heating at 50° C. Moreover, when the adhesive was used after 52 days of storage at room temperature, it showed good adhesion, indicating that this heat-sensitive elastic adhesive has a good shelf-life as well.

EXAMPLE 7 AND EXAMPLE 8

In lieu of dibutyltin dimethoxide, 4 weight parts of dibutyltin diacetylacetonate (U-220; Nitto Kasei) was used in Example 7 and 4 weight parts of dibutyltin dipropoxide (Aldrich Chemical) was used in Example 8. Otherwise, the procedure described in Example 6 was faithfully followed to prepare curing components. Using the same main component as used in Example 6, adhesives were prepared and tested as in Example 6. The results indicated that heat-sensitive adhesion was obtained at 50° C.

What is claimed is:

1. A method for expressing adhesiveness of a heat-sensitive elastic adhesive which comprises heating a thermoplastic crosslinked product, wherein said thermoplastic crosslinked product is obtained by the crosslinking reaction of a composition comprising (A) a saturated hydrocarbon polymer which has a silicon-containing group having a hydrolyzable group bound to a silicon atom and capable of crosslinking through formation of a siloxane bond and (B) a tetravalent tin compound, and said heat-sensitive elastic adhesive comprises the thermoplastic crosslinked product.

2. The method for expressing adhesiveness of a heat-sensitive elastic adhesive according to claim 1,
   wherein the polymer (A) comprises a repeating unit derived from isobutylene, and the total amount of the repeating unit derived from isobutylene in the polymer (A) accounts for not less than 50 weight %.

3. The method for expressing adhesiveness of a heat-sensitive elastic adhesive according to claim 1,
   wherein the tetravalent tin compound (B) is slected from the group consisting of dialkyltin dialkoxides and dialkyltin diacetylacetonates.

4. The method for expressing adhesiveness of a heat-sensitive elastic adhesive according to claim 1,
   wherein the fractional weight of the polymer (A) is less than 30% of the weight of the crosslinked product.

5. The method for expressing adhesiveness of a heat-sensitive elastic adhesive according to claim 1,
   wherein said silicon-containing group is represented by the general formula (1):

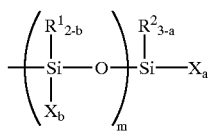

wherein $R^1$ and $R^2$ each independently represents an alkyl group of 1 to 20 carbon atoms, an aryl group of 6 to 20 carbon atoms, an aralkyl group of 7 to 20 carbon atoms, or a triorganosiloxy group of the formula $(R')_3SiO-$ (R' each independently represents a substituted or unsubstituted hydrocarbon group of 1 to 20 carbon atoms); X represents a hydrolyzable group; a represents any of 0, 1, 2 and 3 and b represents any of 0, 1, and 2 but both a and b are not concurrently equal to 0; m represents an integer of 0 to 19.

6. The method for expressing adhesiveness of a heat-sensitive elastic adhesive according to claim 1, wherein the polymer (A) is an isobutylene polymer.

* * * * *